United States Patent [19]

Malone et al.

[11] Patent Number: 4,726,321

[45] Date of Patent: Feb. 23, 1988

[54] METHOD AND APPARATUS FOR FARMING SOFTSHELL AQUATIC CRUSTACEANS

[75] Inventors: Ronald F. Malone; Dudley D. Culley, both of Baton Rouge, La.

[73] Assignee: Louisiana State University and Agricultural and Mechanical College, Baton Rouge, La.

[21] Appl. No.: 877,213

[22] Filed: Jun. 23, 1986

[51] Int. Cl.⁴ .............................................. A01K 61/00
[52] U.S. Cl. ............................................. 119/2; 119/4
[58] Field of Search ..................... 119/2, 3, 4, 5

[56] References Cited

U.S. PATENT DOCUMENTS

| 3,658,034 | 4/1972 | Day et al. | 119/2 |
| 3,696,788 | 10/1972 | Day et al. | 110/2 |
| 4,324,200 | 4/1982 | Johnson | 119/2 |
| 4,475,480 | 10/1984 | Bodker | 119/2 |
| 4,607,595 | 8/1986 | Busot et al. | 119/2 |

FOREIGN PATENT DOCUMENTS 2028621  3/1980  United Kingdom ............ 119/2

Primary Examiner—Carl D. Friedman
Assistant Examiner—Richard E. Chilcot, Jr.
Attorney, Agent, or Firm—Edgar E. Spielman, Jr.

[57] ABSTRACT

This invention relates to a method and apparatus for the automatic farming of softshell aquatic crustaceans, e.g., crabs and crayfish. The method and apparatus utilize the inability of molted crustaceans to achieve self-mobility in the presence of a fluid flow of a certain velocity.

18 Claims, 4 Drawing Figures

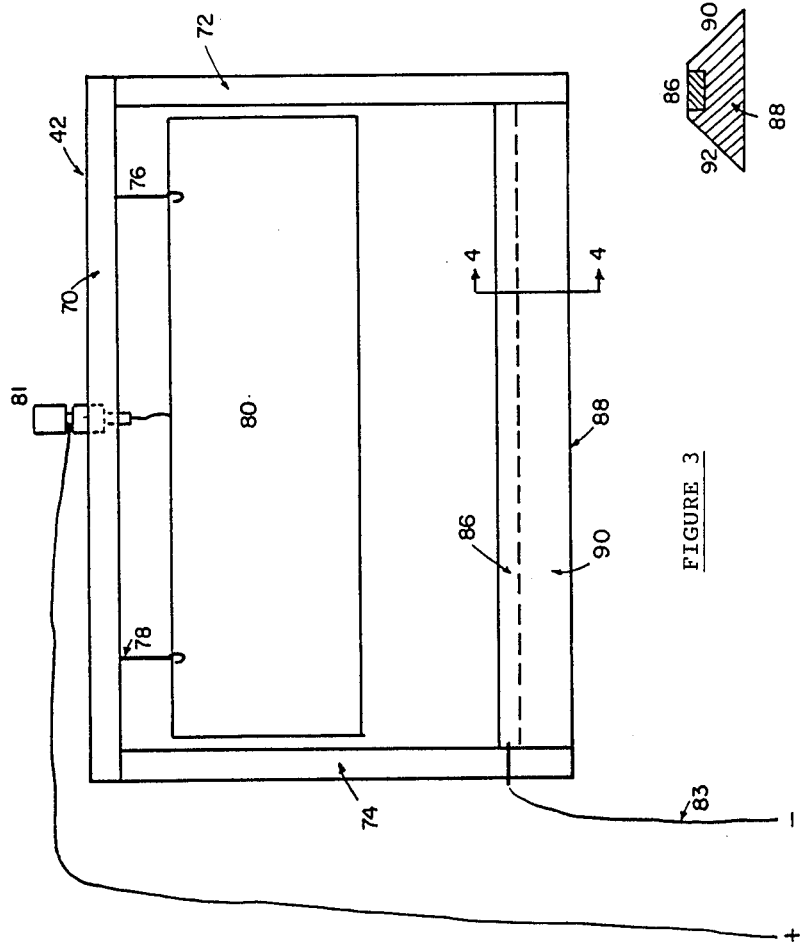

METHOD AND APPARATUS FOR FARMING SOFTSHELL AQUATIC CRUSTACEANS

These invention were made with Government support under Grant NA81AA-D-SG141 awarded by the National Oceanic and Atmospheric Adminstration, U.S. Department of Commerce. The Government has certain rights in this invention.

BACKGROUND OF THE INVENTION

This invention relates to a method and apparatus for the automatic farming of softshell aquatic crustaceans, e.g., crabs and crayfish.

It is an established fact that crabs and crayfish in the "softshell" stage are an epicurean delight. The restaurant trade provides a steady demand for these softshell crustaceans and will pay a price per pound for them which can be 2 to 7 times the price which is paid for the same crustaceans in the "hardshell", i.e., intermolt/-premolt, stage.

Crabs and crayfish both undergo a molt cycle which is repeated often when the crustaceans are immature and less often when they are mature. Harvesting of crabs and crayfish in the softshell stages requires that they be obtained from their environment, be it natural or artificial, as soon as undergoing a molt. Initially, after molt, the exoskeleton is very soft and the crab or crayfish is of prime commercial value. As time passes, the exoskeleton becomes leathery and then hard, the latter being the condition of the exoskeleton in the intermolt/-premolt stage. Generally, in fed immature crabs and crayfish, the period between molts is about 60 days for the former and about 30 days for the latter.

Due to the relatively short time in which the exoskeleton of the crab or crayfish is suitable for the softshell trade, it has been suggested that these crustaceans be placed, while in the intermolt/premolt stage, into an artificial environment so that their molt can be carefully monitored. As soon (within 12 hours) as a molt has occurred, the subject crab or crayfish is harvested from the environment. Such harvesting may be accomplished by use of a dip net as is taught in U.S. Pat. No. 4,475,480. As can be appreciated, such harvesting is manpower-intensive and thus carries with it considerable expense.

Not only must the freshly molted crab or crayfish be soon removed from the environment for the purpose of obtaining the prime exoskeleton condition, but also, quick removal is necessary to prevent losses due to cannibalism. The molted crab or crayfish is a prime target for intermolts as the former's soft exoskeleton cannot provide a hard covering for protecting its vital organs or provide much functionality for its claws and legs. The problem of cannibalism is most aggravated in artificial environments as population densities are usually kept quite high for economic reasons. Thus, the commercial operator must go to great expense and provide continuous monitoring of the environment for new molts or must provide a means for protecting new molts from cannibalism.

The softshell crayfish industry has developed systems which encourage natural segregation of the molts and the intermolts/premolts. Exemplary of such systems is the one described in U.S. Pat. No. 4,475,480.

While such segregation systems help diminish losses from cannibalism, such systems do not mitigate the manpower and associated high costs which are required by manual harvesting.

It is therefore an object of this invention to provide a method and process for the automatic segregation and harvesting of molted aquatic crustaceans from a population of intermolts/premolts.

THE INVENTION

The apparatus of this invention provides an aquatic environment for aquatic molt, premolt and intermolt crustaceans and the selective harvesting of the molted crustaceans therefrom. The aquatic crustaceans can be any of those which have, in the intermolt/premolt stage, appendages which are capable of obtaining traction on a coarse surface sufficient to resist movement of the crustacean by a given fluid velocity. Examples of such crustaceans are: crayfish, lobsters, crabs, shrimp and prawns. Since most all aquatic crustaceans molt most often during their immature stage, it is preferred that the crustaceans used provide, on average, an immature population. For crayfish, the immature crustacean will normally have a length of from about 3 to about 5 inches. The aquatic environment is of a liquid in which the aquatic crustaceans can thrive and grow for a period which is of a duration at least as long as the molt cycle. For immature crayfish, such a period is about 30 days. Most conveniently, the liquid is water which is fresh, brackish or salt depending upon the needs of the particular crustacean. The liquid is kept within a temperature range best suited for the particular crustacean and is aerated. The liquid is also treated, e.g., filtered and recycled or is used in a direct flow-through system. So that the normal molting cycle can be followed, the crustaceans are provided with a food, such as trout pellets, carrots, cracked corn, milo, etc. Trout pellets are preferred.

The apparatus includes a tank for containing the aquatic environment at a depth which is sufficient to cover the crustaceans and which is economical to provide and handle. For crayfish, e.g., *Procambrus clarkii*, a good depth is between 1 and 2 inches. The tank has a liquid inlet and liquid outlet. At least a portion of the water introduced to the tank through the liquid inlet is discharged through the liquid outlet. The tank provides a channel through which the introduced liquid flows to the liquid outlet. The channel has a coarse bed and is configured and dimensioned so that the liquid flow is of a velocity sufficient to transport the molted crustaceans to the liquid outlet but is of insufficient velocity to effect transport of healthy intermolt/premolt crustaceans to such outlet. Obtainment of the velocity necessary to achieve the foregoing, for a particular channel of a given bed coarseness, configuration and dimension, is determined by observing the transport/non-transport effect of the liquid flow an a given population of crustaceans and the increasing or decreasing the velocity, such as by changing the rate of liquid addition to the tank, to achieve the desired transport of molts and non-transport of intermolts/premolts. The liquid flow in the channel should not be significantly increased over the minimum flow which is necessary to achieve the transport/non-transport effect as the fidelity of segregation between the molts and intermolts/premolts will be compromised. This loss in fidelity of segregation is the result of the presence of weak intermolts/premolts which can lose their traction on the channel bed in the face of a high liquid velocity and, thus, will be transported by the liquid as are the molts. Weakness in the intermolts is usually due to injury or small size; however, these weaker intermolts can and will cannibalize the molts when given the opportunity. Premolts become weaker as they approach molting.

It is theorized, though the inventions disclosed herein are not limited by any theory, that the separation of molts from intermolts/premolts achieved by the apparatus and method of this invention, is a direct result of the soft exoskeleton and relative low density of the molts. A soft exoskeleton deprives the molts of a means for obtaining traction on the coarse channel bed in the face of the liquid velocity used. While the molts' musculature is not adversely affected by molting, the muscles do not have any rigid structure with which to act to exert the forces needed for achieving good traction. Also acting against achieving traction is the relatively low density of the molts which makes molts more buoyant in the liquid. Further, their lower density makes the molts very susceptible to being swept with the liquid flow.

In a preferred form, the apparatus of this invention has, at a location upstream of the liquid outlet, first and second electrodes which lie in a plane substantially transverse the direction of liquid flow at the electrodes' location. These electrodes form a gate which discourages intermolts/premolts from passing therethrough without having a like effect on the through passage of molts. The electrodes are separated one from the other a distance which is insufficient for the crustaceans to pass therebetween without contacting both electrodes simultaneously. By contacting, it is meant actual contact or the sufficient closeness of actual contact so that an electrical shock is administered to the crustacean as it passes between the electrodes. In a highly preferred form, one electrode is stationary and located under the surface of the liquid flow while the other electrode is pivotally mounted and located above the surface of the liquid flow. In this manner, there is no electrical connection or usage until a crustacean makes contact with the electrodes. The electrodes are connected oppositely to the negative and positive terminals of an electrical power source, e.g., a battery. The electrical power source provides voltage within the range of from about 6 to about 18 volts and amperage of from about 5 mA to about 200 mA. Preferably, for crayfish, a voltage of from about 9 to about 15 volts and an amperage of from about 5 mA to about 25 mA is suitable. In all cases, the shock administered is not lethal or residually harmful to the crustacean. The actual voltage selected is dependent to some extent upon the conductivity of the liquid used.

The use of the electrode gate is beneficial as some intermolts/premolts will move towards the liquid outlet as a result of random movement under their own locomotive power. When such intermolts/premolts enter into the space between the electrodes, they, more often than not, will enter in a head first orientation. Contact with the electrodes is then made and the electrical shock is administered causing a responsive muscle contraction, which contraction propels the intermolt/premolt backwards and away from the electrodes When a molt enters the space between the electrodes, its head-tail orientation is random as it is being swept along with the flowing liquid. Thus, there is good probability that a molt will make contact with the electrodes in an orientation which enhances or does not affect its passage between the electrodes. If the electrical shock propels the molt away from the electrodes, the molt will merely be brought back to the electrodes by the flowing liquid for another attempted passage. Passage between the electrodes, even though an electrically shocking passage, is allowed by the free swing or pivot of the above-the-surface electrode. It is to be understood that any of several electrode arrangements can be used so long as the electrical shock is administered and the passage of the molts is allowed.

There will be some instances, even though few in number, where intermolts/premolts will contact the electrodes in a tail-first orientation. In this instance, the electrical shock will cause the intermolt/premolt to propel itself through the electrode gate. Thus, further segregation is needed between these few intermolts/premolts and molts prior to the removal of the molts from the tank via the liquid outlet. This is easily accomplished by using another electrode shocking system similar to the one above described and locating it so that it straddles the liquid outlet. With the use of a second electrical system, the probability of having an intermolt/premolt pass through the liquid outlet is greatly reduced.

In a preferred embodiment of this invention, the approaches to the electrodes are each comprised of an inclined surface which rises from a location on the channel bed to the downstream location of one of electrodes which make up each electrode pair. The inclined surface is useful to the intermolts/premolts as it gives them a surface against which they can push to avoid the gates. Also, the vertical height of the inclined surface is used to insure the desired water depth in the tank.

Promotion of molt from intermolt/premolt segregation can also be effected by shading all of the channel except for that portion which extends from the first pair of electrodes to the liquid outlet. It has been observed that most crustaceans seek shaded or dark areas and will move to lighted ones only when pressured to so do. Thus, the intermolts/premolts will tend to remain in the darker area as long as they can maintain the traction necessary to resist being swept by the flowing liquid. The molts do not have the ability of maintaining traction and are thus swept into the lighted area.

In another preferred form, the apparatus of the invention provides for a continuous channel and for only a portion of the flowing liquid to exit through the liquid outlet. Downstream of the liquid outlet, make-up liquid is added to the channel. The remainder of the liquid flow returns to the liquid inlet. The liquid outlet is dimensioned so that from about 10 to about 50 percent of the liquid flow is returned. Care needs to be taken that the amount of liquid removed is sufficient to insure that the majority of the molts in the flowing liquid pass through the liquid outlet after one pass through the channel. The benefit of having a continuous channel is that there is provided a path along which the intermolts/premolts, which are in the vicinity of the liquid outlet, can move so that a population build-up of intermolts/premolts about the liquid outlet area is diminished. Also, it is further preferred that a part of the channel bed adjacent to and downstream of the liquid outlet have a smooth condition. In this way, intermolts/premolts encountering the smooth surface lose their traction and are swept in a direction away from the liquid outlet.

This invention additionally relates to a method for automatically separating and harvesting aquatic molted crustaceans from a population of crustaceans, which method comprises: raising the crustacean population, for a period of time approximate to the molt cycle of the crustaceans, in a tank having a channel supportive of liquid flow and having a coarse channel bed; providing a liquid flow in the channel to create a liquid velocity sufficient to transport the molted crustaceans in the population to a discharge port but insufficient to effect transport of the healthy, intermolt/premolt crustaceans to the discharge port; and removing, from the tank through the discharge port, at least a portion of the flowing liquid and at least portion of the molted crustaceans transported to the discharge port. In the case of immature crayfish, the molting cycle is about 30 days. To encourage molting and growth, the crayfish are fed during their residence within the tank. It is preferred that the fluid flow be provided by discharging, with velocity, liquid into the channel in the substantial direction of liquid flow. The liquid velocity within the channel can be within the range of from about 0.2 ft/sec to about 3.0 ft/sec. When the crustacean is the red crayfish, *Procambrus clarkii*, the velocity is preferably about 0.25 ft/sec to about 1.25 ft/sec. The coarse channel bed needs to be sufficiently coarse to provide traction for healthy intermolt/premolt crustaceans to resist transport by the flowing liquid; however, the channel bed needs to be insufficiently coarse to provide traction for the molting crustaceans to resist such transport.

In a preferred embodiment, the method of this invention additionally includes applying an electrical shock to any molt and intermolt/premolt crustacean which pass a point which is upstream of the discharge port. It is important that the electrical shock be nonlethal to the crustaceans. A most highly preferred form of the method of this invention additionally provides a second electrical shock to any crustacean which begins to pass through the discharge port. As before described, the utilization of electrical shock enhances segregation of the molts from the intermolts/premolts.

These and other features of this invention contributing to satisfaction in use and economy in manufacture will be more fully understood from the following description of a preferred embodiment of the invention when taken in connection with the accompanying drawings in which identical numerals refer to identical parts and in which:

FIG. 3 is an enlarged elevational view of an electrode gate shown in FIG. 1; and FIG. 4 is a section view taken through section lines 4—4 in FIG. 3.

Figure 1:
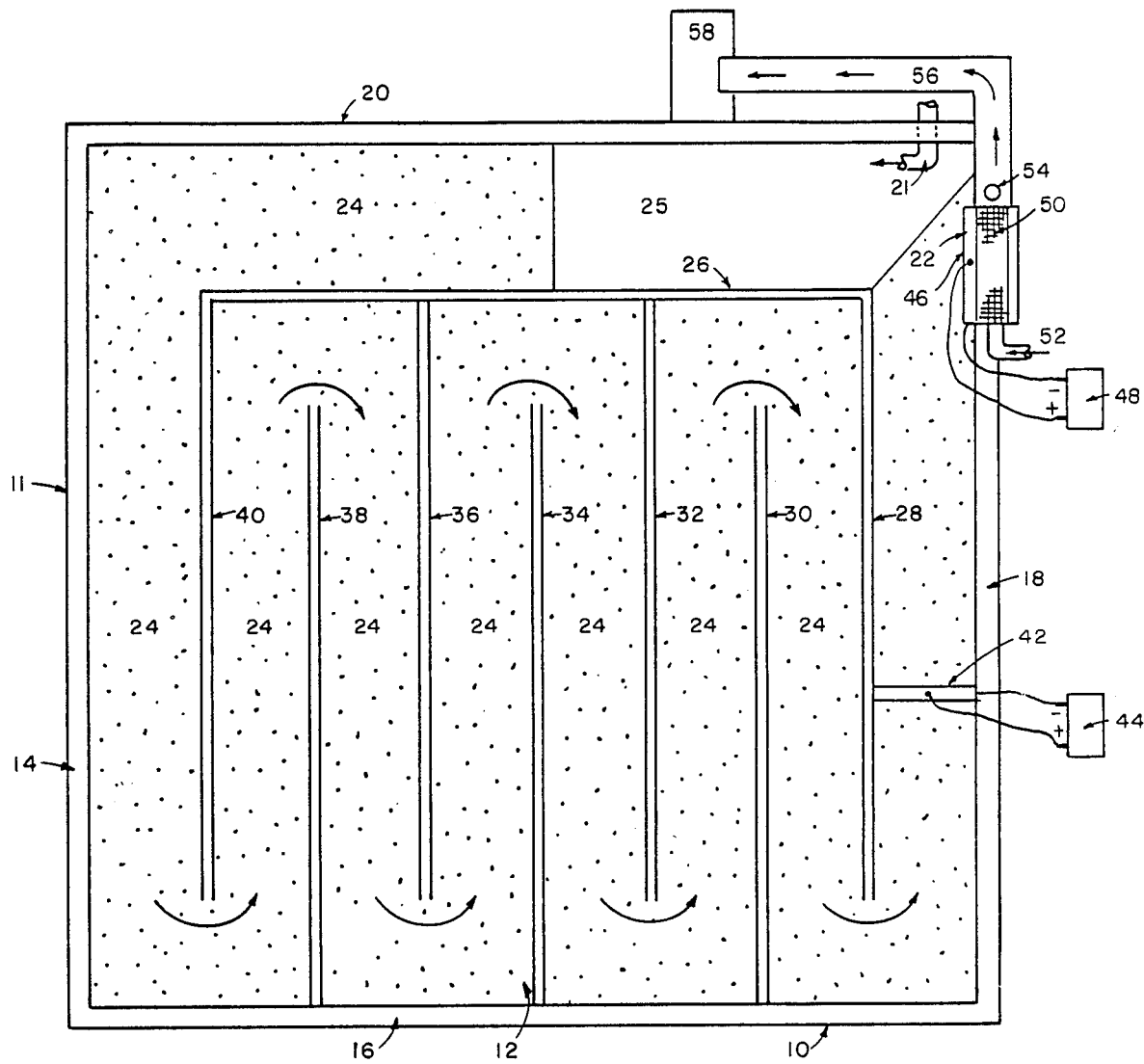
FIG. 1 is a top plan view of an apparatus of this invention.
Figure 2:
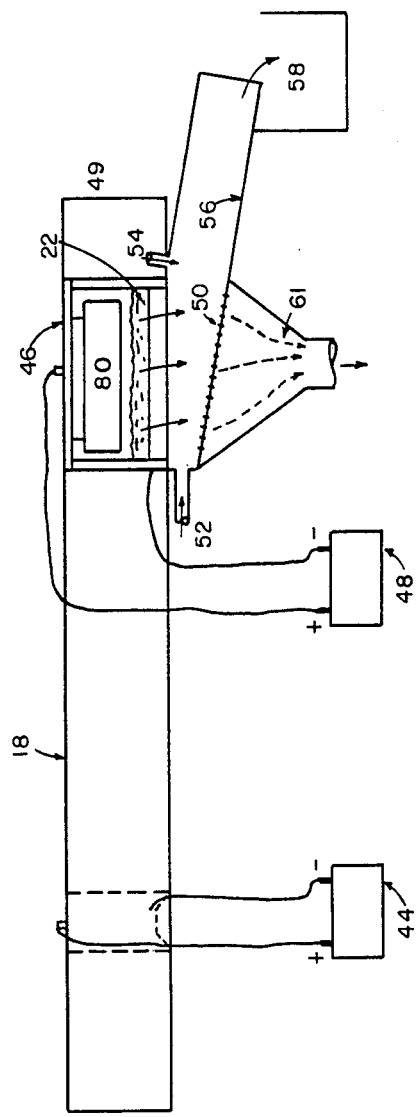
FIG. 2 is a side elevational view of the discharge side of the apparatus shown in FIG. 1.

Referring now to FIGS. 1-4, there can be seen an apparatus of this invention, generally designated by the numeral 10. Apparatus 10 comprises tank 11 which has a floor 12 and upstanding sidewalls 14, 16, 18 and 20 about its periphery. Tank 11 is dimensioned so as to provide room for a population density of from about 0.5 to about 1.5 pounds crustaceans per square foot up to the location of electrical gate 42. Tank 11 has a continuous channel 24 defined within its interior. Defining channel 24 are walls 26, 28, 30, 32, 34, 36, 38 and 40. Wall 26 is in a perpendicular orientation to the other walls. As can be seen in FIG. 1, walls 28, 32, 36 and 40 are in abutment with wall 26, while walls 30, 34 and 38 are in abutment with tank wall 16. With this arrangement, a simple maze is provided. The width of channel 24 is such that a liquid velocity within the range of from about 0.2 ft/sec to about 3.0 ft/sec can be achieved with an inflow of liquid through liquid inlet 21 and an outflow of at least a portion of such liquid through outlet 22. The inlet and outlet flows are equal thereby maintaining a relatively constant liquid depth for any channel location. With an inlet flow and outlet flow of about 20 gal/min, the width of channel 24 can be within the range of from about 6 to about 12 inches and have a depth within the range of from about 1 to about 3 inches. The length of channel 24 should be such that, with a given channel width, the necessary area is provided to accomplish the desired population density.

Except for a smooth portion 25, channel 24 has a coarse bed. The bed can be conveniently made coarse by mixing builder sand, having an average mean diameter of 0.5 mm to about 5 mm, and a binder, e.g., epoxy, and applying same to floor 12. When dry, the coarseness provided by such a mix has been found to be suitable for the purpose of this invention when used with the before delineated flow rate range.

Channel 24 is traversed by electrical gate 42, as is seen in FIG. 1. Electrical gate 42 is in electrical contact with a battery 44 which acts as an electrical power supply. The electrical supply can be a conventional 120 V AC feed which is modified to a lower AC or DC current by a transformer.

Liquid outlet 22 has, across its extent, electrical gate 46 which is in electrical communication with battery 48 which acts as its power supply. Both electrical gates 42 and 46 can be designed and configured as is shown in FIGS. 3 and 4. The description of electrical gate 42 is equally applicable to electrical gate 46. Electrical gate 42 has a frame comprised of vertical braces 72 and 74 which are joined at their tops by horizontal brace 70. Mounted through horizontal brace 70 are threaded eye-hooks 76 and 78. By providing threaded eye-hooks, the height of electrode plate 80 can be adjusted. Pivotably hung from threaded eye-hooks 76 and 78 is electrode plate 80. Electrode plate 80 is attached on its flat surface with positive electrical lead 81 which is in turn attached to the anode of battery 44. At the base of electrical gate 42 is riser 88. Riser 88 provides inclined walls 90 and 92, with inclined wall 90 facing upstream and inclined wall 92 facing downstream. The provision of oppositely facing inclined walls is desirable as the formation of eddies and strong current is avoided when the liquid flows over riser 88. Inset within the upper portion of riser 88 is bar electrode 86 which is in electrical communication with the cathode of battery 44 by way of electrical lead 83.

Adjacent and below outlet 22 is screen 50. Water is fed via conduit 52 across screen 50. Located below screen 50 is funnel 61 which returns water which has passed through the screen to inlet 21 or to another apparatus 10 located therebelow. Extending from the downstream end of screen 50 is delivery chute 56. Additional water is provided to chute 56 by way of conduit 54. Chute 56 has a discharge end which opens into storage container 58.

FIG. 1 shows that channel 24 has a smooth portion, 25, which extends from liquid outlet 22 for some downstream distance to a point below liquid outlet 21.

It is to be understood that economy in operation can be achieved by providing several apparatuses of the type shown in FIGS. 1-4 and stacking them so that the outflow of liquid through liquid outlet 22 is received in a lower apparatus and is used by that receiving apparatus as its inflow of liquid. Some makeup liquid may need to be added to the lower apparatus. In any event, the reusing of the liquid and passing it down from apparatus to apparatus results in an energy savings as the bulk of the liquid used need only be pumped a single time. It is also contemplated that the apparatuses may be stacked in such a way that the upper apparatus provides shading for that portion of channel 24 which precedes the first electrode gate 42. As mentioned previously, such shading encourages the intermolt/premolt crustacean to remain away from electrode gate 42. The stacking of apparatuses also provides a convenient way for feeding several apparatuses as the feed can be added to the upper apparatus and be carried to the lower apparatuses by the outflow from apparatus to apparatus.

In use, the crustaceans are deposited within channel 24. The fluid introduced via fluid inlet 21 flows through channel 24 with some return after liquid outlet 22. After being initially added to channel 24, it will be observed that the crustaceans move to achieve a random distribution throughout channel 24. As the crustacean molts, it will no longer be able to achieve traction on the channel bed and will be swept by the liquid flow within the channel to electrode gate 42. Since the molted crustacean will have difficulty in orienting itself in the environment provided by apparatus 10, it will pass to electrode 42 in a random orientation. More often than not, the shock administered by electrode gate 42 will encourage or have no affect on the passage of the molted crustacean through electrode gate 42. As pointed out previously, over a period of time, some intermolt/premolt crustaceans will pass through electrode gate 42. These intermolt/premolt crustaceans are discouraged from passing through liquid outlet 22 by use of a second electrode gate 46. It has been observed in crayfish that crayfish which have been shocked by the electrode gate avoid approaching same again. Thus, since the intermolts/premolts that have passed through electrode gate 42 have received a shock, they will have a great reluctance to approach second electrode gate 46. The molted crustaceans, however, have little choice but to follow the flow through liquid outflow 22 as they are incapable of achieving self-mobility in channel 24. That portion of the liquid flow not exiting liquid outlet 22 returns via return over smooth portion 25. The intermolts/premolts following smooth portion 25 will engage the smooth surface and are swept to restart their movement and residence in the maze provided by channel 25. Also, smooth portion 25 prohibits random migration of intermolt/premolt crustaceans against the liquid flow towards liquid outlet 22.

We claim:

1. An apparatus which provides an aquatic environment for a population of aquatic molted, premolt and intermolt curstaceans and which harvests said aquatic molted crustaceans therefrom, said apparatus comprising:
  (a) a tank for containing said aquatic environment;
  (b) a channel in said tank, said channel having a coarse bed; and
  (c) a flow control means for maintaining, in said channel, a flow of liquid which is of sufficient velocity to cause said molted crustaceans to loss traction on said coarse bed and to be transported along said channel but which said velocity of said flow of liquid is insufficient to cause loss of traction on said coarse bed by at least a portion of said premolt and intermolt crustaceans.

2. The apparatus of claim 1, wherein said tank comprises a tank floor and an upstanding peripheral wall.

3. The apparatus of claim 1, wherein the coarse bed of said channel is provided by a substrate coated with a sandbinder mix, said sand having an average mean diameter within the range of from about 0.5 mm to about 5 mm.

4. The apparatus of claim 1 wherein said flow control means comprises a liquid inlet to introduce liquid into said channel and a liquid outlet to discharge at least a portion of said introduced liquid and at least a portion of said transported molted crustaceans from said channel.

5. The apparatus of claim 4 wherein, upstream of said liquid outlet, there is additionally provided first and second electrodes, said electrodes.
  (i) lying substantially in a plane which is transverse the direction of liquid flow at the location of said electrodes,
  (ii) being separated one from the other so that said molted, premolt and intermolt crustaceans attempting to pass between said electrode will contact said electrodes, and
  (iii) being connected oppositely to the positive and negative terminals of an electrical power source, said first electrode being rigidly located beneath the surface of said liquid flow and said second electrode being pivotally located above the surface of said liquid flow.

6. The apparatus of claim 5 wherein, at a location upstream of and adjacent said liquid outlet, and downstream from said first and second electrodes, there is additionally provided third and forth electrodes, said electrodes,
  (i) lying substantially in a plane which is transverse the direction of liquid flow at the location of said electrodes,
  (ii) being separated one from the other so that said molted, premolt and intermolt crustaceans attempting to pass between said electrodes contact said electrodes, and
  (iii) being connected oppositely to the positive and negative terminals of an electrical power source, said third electrode being rigidly located beneath the surface of said liquid flow and said fourth electrode being pivotally located above the surface of said liquid flow.

7. The apparatus of claim 4 wherein said channel is continuous whereby that portion of said liquid flow which is not discharged through said liquid outlet recirculates through said channel.

8. The apparatus of claim 7 wherein a part of the channel bed, adjacent to and downstream from said liquid outlet, is smooth.

9. The apparatus of claim 4 wherein, at a location upstream of and adjacent to said liquid outlet, there is additionally provided two electrodes,
  (i) lying substantially in a plane which is transverse the direction of liquid flow at the location of said electrodes,
  (ii) being separated one from the other so that said molted, premolt and intermolt crustaceans attempting to pass between said electrodes will contact said electrodes, and
  (iii) being connected oppositely to the positive and negative terminals of an electrical power source, one of said electrodes being rigidly located beneath the surface of said liquid flow and the other of said electrodes being pivotally located above the surface of said liquid flow.

10. A method for separating aquatic molted crustaceans from premolt and intermolt crustaceans, which process comprises:
   (a) raising said crustaceans, for a period of time approximate to the molt cycle of said crustaceans, in a tank having a channel supportive of a liquid flow and having a coarse channel bed;
   (b) producing a liquid flow in said channel of a velocity sufficient to cause said molted crustaceans to lose tracation on said coarse channel bed and to be transported along said channel to a discharge port but which said velocity of said liquid flow is insufficient to cause loss of traction on said coarse bed by at least a portion of said premolt and intermolt crustaceans;
   (c) and removing, from said tank through said discharge port at least a portion of said liquid flow and at least a portion of said molted crustaceans transported to said discharge port.

11. The method of claim 10 wherein said liquid velocity is provided by discharging a liquid, with velocity, into said channel in the substantial direction of liquid flow.

12. The method of claim 10 wherein said liquid flow has a velocity within the range of from about 0.2 ft/sec to about 3.0 ft/sec.

13. The method of claim 10 wherein an electrical shock is administered molted, or premolt or intermolt crustaceans which pass a point which is upstream of said discharge port, said electrical shock being non-lethal to such crustaceans.

14. The method of claim 13 wherein said shock is provided by an electrical current of between 6 and 18 volts and 5 mA and 200 mA.

15. The method of claim 13 wherein a second electrical shock is administered to molted, premolt or intermolt crustaceans which pass a point adjacent to and upstream from said discharge port and said electrical shock being non-lethal to such crustaceans.

16. The method of claim 15 wherein said shocks are provided by an electrical current of between 6 and 18 volts and 5 mA and 200 mA.

17. The method of claim 10 wherein an electrical shock is administered to molted, premolt or intermolt crustaceans which pass a point upstream from said discharge port said electrical shock being non-lethal to such crustaceans.

18. The method of claim 17 wherein said shock is provided by an electrical current of between 6 and 18 volts and 5 mA and 200 mA.

* * * * *